United States Patent [19]
Oinuma et al.

[11] Patent Number: 5,385,664
[45] Date of Patent: Jan. 31, 1995

[54] APPARATUS FOR PRODUCING ULTRAPURE WATER

[75] Inventors: Masayoshi Oinuma; Toru Kawachi, both of Tokyo, Japan

[73] Assignee: Kurita Water Industries Ltd., Tokyo, Japan

[21] Appl. No.: 100,137

[22] Filed: Aug. 2, 1993

[30] Foreign Application Priority Data

Aug. 25, 1992 [JP] Japan .................. 4-225681

[51] Int. Cl.$^6$ ................................. C02F 3/02
[52] U.S. Cl. ................... 210/151; 210/259; 210/266; 210/631; 210/900
[58] Field of Search ........... 210/631, 617, 151, 900, 210/259, 266, 618, 620

[56] References Cited

U.S. PATENT DOCUMENTS

| | | | |
|---|---|---|---|
| Re. 144 | 7/1942 | Ward | 210/617 |
| 2,065,123 | 12/1936 | Downes | 210/617 |
| 2,388,795 | 11/1945 | Montgomery et al. | 210/151 |
| 2,528,887 | 11/1950 | Kiekhoefel et al. | 210/151 |
| 3,232,434 | 2/1966 | Albersmeyer | 210/151 |
| 3,617,554 | 11/1971 | Thorborg | 210/664 |
| 3,870,033 | 3/1975 | Faylor et al. | 210/669 |
| 4,141,824 | 2/1979 | Smith | 210/618 |
| 4,322,296 | 3/1982 | Fan et al. | 210/618 |
| 4,800,021 | 1/1989 | Desbos | 210/150 |
| 4,810,388 | 3/1989 | Trasen | 210/238 |
| 4,863,608 | 9/1989 | Kawai et al. | 210/763 |
| 4,904,387 | 2/1990 | Jordan | 210/259 |
| 5,019,268 | 5/1991 | Rogalia | 210/151 |
| 5,049,266 | 9/1991 | Gotz et al. | 210/151 |
| 5,059,317 | 10/1991 | Marius et al. | 210/266 |
| 5,073,268 | 12/1991 | Saito et al. | 210/651 |
| 5,151,187 | 9/1992 | Behmann | 210/151 |

FOREIGN PATENT DOCUMENTS

| | | |
|---|---|---|
| 61-111192 | 5/1986 | Japan . |
| 61-111198 | 5/1986 | Japan . |
| 62-282689 | 12/1987 | Japan . |
| 63-031592 | 2/1988 | Japan . |

*Primary Examiner*—Cynthia L. Nessler
*Attorney, Agent, or Firm*—Kanesake & Takeuchi

[57] ABSTRACT

In an ultrapure water production apparatus formed of a source water pretreatment system, a primary pure water system, and a secondary pure water system, the source water pretreatment system includes a biological processing device.

12 Claims, 2 Drawing Sheets

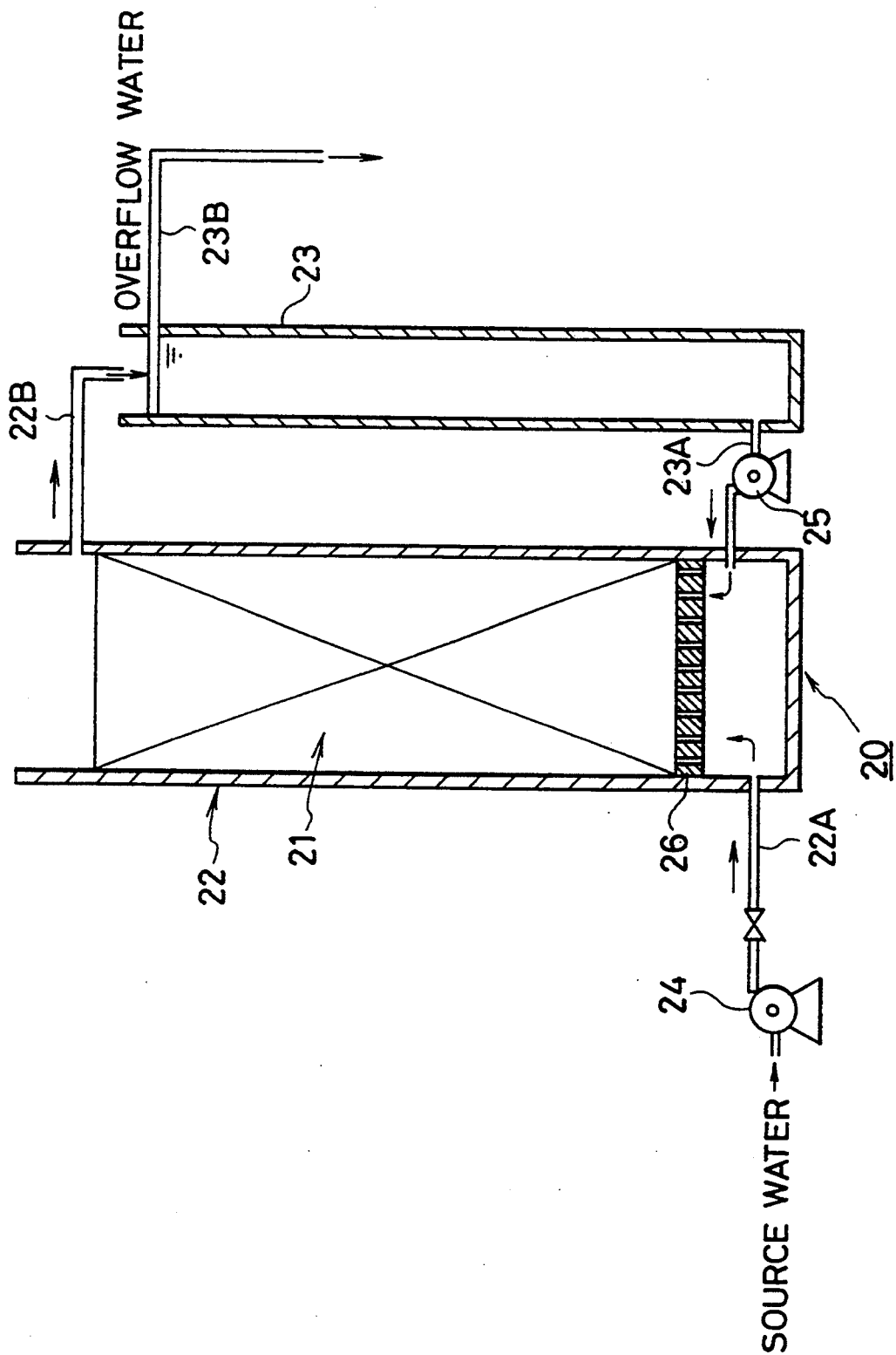

5,385,664

APPARATUS FOR PRODUCING ULTRAPURE WATER

BACKGROUND OF THE INVENTION

This invention relates to an apparatus for production of ultrapure water, and more particularly relates to an ultrapure water production apparatus by which the TOC (Total Organic Carbon) content of the water produced is greatly reduced to be lower than that of water produced by conventional means.

DESCRIPTION OF THE RELATED ART

Conventional devices for producing ultrapure water from source water (raw water) such as city water, well water, or industrial water basically includes a pretreatment system, a primary pure water system, and a secondary pure water system. The pretreatment system is made up of a coagulating device, a flotation device, and a filtration device. The primary pure water system includes a two stage reverse osmosis membrane separation device and a mixed bed ion exchange device, or a multi stage demineralizing device and a reverse osmosis membrane separation device, and the secondary pure water system includes a low pressure mercury ultraviolet oxidization device, a mixed bed ion exchange device, and an ultrafiltration membrane separation device.

Among these devices, the ones that reduce the TOC content of the source water, by methods such as separation, adsorption, and decomposition, are the reverse osmosis membrane separation devices, the multi stage demineralizing device, and the low pressure mercury ultraviolet oxidization device.

The mechanisms by which the TOC content is reduced in the device are as follows:

Reverse osmosis membrane separation device: This is a filtration method which uses a reverse osmosis membrane to remove ionic and colloidal TOC.

Multi stage demineralizing device: Removes TOC components by adsorption or ion exchanging by an ion exchange resin.

Low pressure mercury ultraviolet oxidization device: Breaks down TOC into organic acids and then into $CO_2$, using 185 nm ultraviolet rays from low pressure mercury ultraviolet lamps. Broken down organic matter is removed in the next stage by ion exchange resin. The device is used especially for breaking down organic matter which is volatile.

However, ultrapure water produced by the conventional ultrapure water production devices discussed above still contains approximately 2–5 ppb of TOC.

One approach to further reducing the TOC content of ultrapure water that comes to mind is to use multiple stages of a reverse osmosis membrane separation device and increase the amount of ultraviolet irradiation performed by the low pressure mercury ultraviolet oxidization device, but research carried out by the present inventors has shown that it is not possible to further reduce the TOC content of ultrapure water by this kind of method. The reason for this is that when dealing with the kind of minute quantities of TOC that are present in ultrapure water it is necessary to consider not only the TOC originating in the source water but also elusion components that solve out into the water from parts made of organic materials with which the water comes into contact in the purifying apparatus itself, such as pipes and the body of each device, and from this it appears possible that no application of conventional technology alone will yield further TOC reduction.

OBJECT AND SUMMARY OF THE INVENTION

An object of the present invention is to provide an apparatus for producing ultrapure water which can produce ultrapure water with markedly reduced TOC content.

The ultrapure water production apparatus of this invention has a source water pretreatment system, a primary pure water system, and a secondary pure water system, and has the feature that the pretreatment system includes biological treatment means.

In An ultrapure water production apparatus according to this invention, because biological treatment means is incorporated as part of the source water (city water, well water, industrial water etc.) pretreatment system, it can to a high degree remove urea in the source water that is an origin of the TOC in ultrapure water and that cannot be removed by conventional pretreatment systems, and makes it possible to obtain ultrapure water with markedly reduced concentratios of TOC.

Before proceeding to develop technology for further reducing the TOC content of ultrapure water, the present inventors carried out an investigation as to whether the TOC content in ultrapure water originates in the source water or in elusions. First, an examination of year-round data on the TOC content of ultrapure water produced by ultrapure water production apparatus in operation revealed that the TOC content undergoes cyclic seasonal changes.

Because the water temperature is controlled and kept constant in ultrapure water production apparatus in use, it seems unlikely that the quantity of the elusion from an apparatus would vary. Accordingly, assiduous research was directed at identifying the substances in source water that are the origin of the organic components contained in ultrapure water that originate in the source water. As a result of this research it was found that one component which is present in source water and which cannot be removed by using conventional ultrapure water production apparatus is urea ($N_2\ CONH_2$), and that urea is present in source water (city water, industrial water, etc.) in quantities ranging from several tens ppb to several hundreds ppb.

By concentrating ultrapure water (20–30 times) obtained by conventional means, and measuring the concentration of the urea present in the water, urea was found to constitute over 50% of the TOC content in ultrapure water.

It was thus discovered that ultrapure water production apparatus currently in use does not effectively eliminate the urea that is present in source water, and that this is one obstacle for reducing the TOC content of ultrapure water.

It was then discovered that a biological treatment means is suitable as a method of reducing the amount of urea present in source water, and the present invention was achieved.

BRIEF DESCRIPTION OF THE DRAWINGS

FIG. 2 is a cross-sectional view of an upward flow biological decomposition device suitable for use as the pretreatment system of the ultrapure water production apparatus of the present invention.

DESCRIPTION OF THE PREFERRED EMBODIMENT

A preferred embodiment of the invention will now be described, with reference to the accompanying drawings.

Figure 1A:
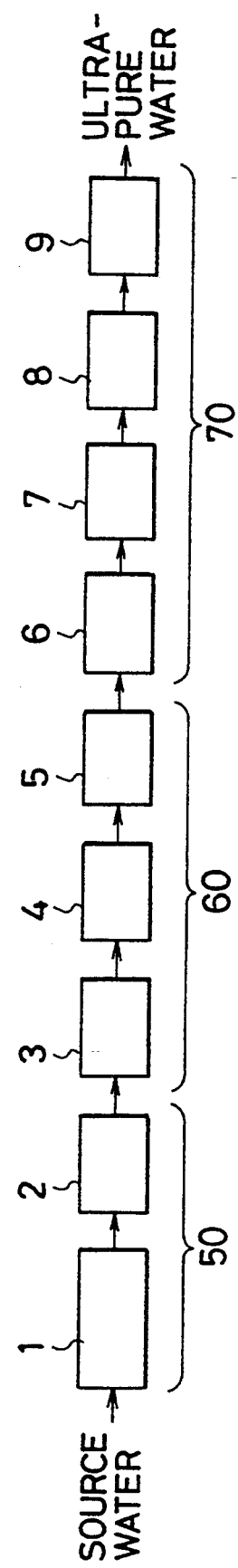
FIG. 1A and FIG. 1B are flow diagrams of two ultrapure water production apparatus according to two versions of a preferred embodiment of the present invention.

The ultrapure water production apparatus shown in FIG. 1A is made up of a pretreatment system 50, made up of a biological treatment device 1 and a membrane filter, that is to say ultrafiltration (UF) or microfiltration (MF) device 2; a primary pure water system 60, made up of a first reverse osmosis (RO) device 3, a second reverse osmosis (RO) device 4, and a mixed bed ion exchange device 5; and a secondary pure water system 70, made up of (a tank 6 and) a low pressure mercury ultraviolet oxidization device 7, a mixed bed ion exchange device 8, and a UF membrane separation device 9; the devices being set up in series in this order.

The source water such as city water, industrial water or underground water first enters the biological treatment device 1, and undergoes biological treatment in which organics such as urea are broken down and removed. The biologically treated water enters the UF or MF device 2 for removing the biomass flow-off from the biological treatment device 1, and undergoes membrane separation.

This pretreated water thus treated in the pretreatment system 50 next enters the primary pure water system 60, where it undergoes 2-stage RO membrane separation processing in the first RO device 3 and the second RO device 4 and then undergoes ion exchange in the mixed bed ion exchange device 5.

Then, in the secondary pure water system 70, the water from the primary pure water system 60 passes through the tank 6 and enters the low pressure mercury ultraviolet oxidization device 7, wherein the TOC content is ionized and broken down, and the ionized organic constituents are removed in the next stage by the mixed bed ion exchange device 8. The water from the mixed bed ion exchange device 8 undergoes further membrane separation processing in the UF membrane separation device 9, and ultrapure water is obtained.

Figure 1B:
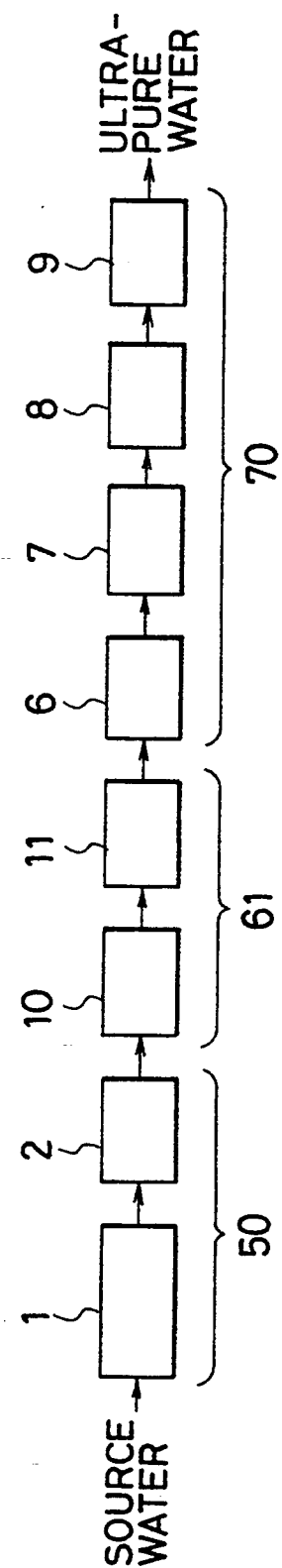

The ultrapure water production apparatus shown in FIG. 1B is identical to the ultrapure water production apparatus shown in FIG. 1A except that in the ultrapure water production apparatus of FIG. 1B the primary pure water system 61, is made up of an multi stage demineralizing device 10 and a RO device 11.

Apart from the provision of a biological treatment device, as a pretreatment system through which the source water passes directly, an ultrapure water production apparatus according to this invention has basically the same construction as that of a conventional ultrapure water production apparatus, and conventional devices can be used without modification for the RO devices and multi stage demineralizing devices, etc., of the primary and secondary pure water systems.

Ordinary biological treatment means for treating organic waste water, such as activated sludge process have not been used for TOC reduction of ultrapure water. This is because when they are applied to water of low organic content concentration, like the city water, well water and industrial water used as source water for ultrapure water production, the biomass cannot be maintained.

However, the present inventors have confirmed that, as a biological treatment means in which the biomass is not allowed to flow off, an upward flow biological decomposition device 20 as shown in FIG. 2, in which a special carrier is fluidized by an upward flow and a biomass is fixed to the surface of the carrier, is effective.

The upward flow biological decomposition device 20 shown in FIG. 2 has a biological decomposition tank 22, containing activated carbon, and an aeration tank 23. A source water inflow pipe 22A is connected to the lower part of the biological decomposition tank 22, and a treated water discharge pipe 22B is connected to the upper part. The aeration tank 23 has an outflow pipe 23A connected to its lower part, and an overflow water outflow pipe 23B is connected to the upper part. The outflow pipe 23A is connected to the lower part of the biological decomposition tank 22. In FIG. 2, reference numerals 24 and 25 denote pumps, and 26 is a multiple hole plate.

In the upward flow biological decomposition device 20 of this preferred embodiment, biological processing is carried out by a biomass held on the surface of a carrier of bodies of activated carbon 21, or of anthracite (hard coal), sand, zeolite, ion exchange resin, or molded resin, or the like, of which elusion into the source water can be assumed to be negligible, and the carrier is fluidized by the upward flow of the source water and the outflow water from the aeration tank 23 entering the lower part of the biological decomposition tank.

The overflow water, which is water that having been discharged from the biological decomposition tank 20 and passed through the discharge pipe 22B into the aeration tank 23 is discharged through the overflow water outflow pipe 23B, is supplied as biologically treated water to the next stage.

Because the source water contains dissolved oxygen, the biological treatment proceeds aerobically, but in cases when the concentration of this dissolved oxygen is low, it is necessary to aerate in the aeration tank to create aerobic conditions for the biological treatment. This aeration ensures that the biomass is activated, and that TOC components such as urea in the source water are broken down.

In this kind of biological treatment, when the source water is poor in nutrient sources, and thorough biological treatment, cannot be carried out because the biomass cannot be kept up, the source water is replenished with nitrogen and phosphorus.

The ultrapure water production apparatus shown in the drawings is just one preferred embodiment of the present invention. The invention is not limited to this preferred embodiment, and, as long as the essential points are not changed, various changes could be made. For example, the biological treatment device does not have to be of upward water flow type, and may instead be of downward water flow type; a coagulator or a coagulating filter device or the like may be included either in the stage after or the stage before, or both after and before the biological treatment device. And as the means, disposed immediately downstream of the biological treatment device, for removing the biomass flow-off from the biological treatment device, a sand filter device or the like may be used instead of a membrane filter.

By using an ultrapure water production apparatus according to this invention to produce ultrapure water from source water i.e. city water, well water, or industrial water, the TOC content of the ultrapure water obtained can be markedly decreased and ultrapure water of extremely high purity can be produced.

The present invention will now be explained in more specific terms, with reference to actual results obtained by using Example of the invention and using Comparative Example.

EXAMPLE 1

Treatment was carried out on a source water (city water of Atsugi City, Kanagawa, Japan (April–June, 1993)) by using the ultrapure water treatment apparatus of FIG. 1A. For the biological treatment device, the upward flow biological decomposition device with a biomass carrying on activated carbon shown in FIG. 2 was used, and a UF device was used for the stage after that. The source water residence time of the upward flow biological decomposition device was 30 minutes. The TOC content of the ultrapure water thus obtained is shown in TABLE 1.

Comparative Example 1

Treatment was carried out exactly as per Example 1 except that no biological treatment device was used. The TOC content of the ultrapure water obtained is shown in TABLE 1.

TABLE 1

|  | TOC (ppb) |
|---|---|
| Example 1 | 0.5–0.8 |
| Comparative Example 1 | 2.2–3.0 |

As is clear from TABLE 1, with an ultrapure water production apparatus according to this invention, TOC content is reduced to 0.5–0.8 ppb, and water of very high quality can be obtained.

What is claimed is:

1. An ultrapure water production apparatus, comprising:
   a source water pretreatment system including a biological treatment device formed of an upward flow biological decomposition device containing therein activated carbon as carriers to be fluidized by an upward flow of source water and biomass fixed to surfaces of the carriers, said upward flow biological decomposition device including a biological decomposition tank containing the carriers with the biomass; an aeration tank; a source water inflow pipe connected to a lower part of the biological decomposition tank for supplying the source water to the biological decomposition tank; a treated water discharge pipe connected to an upper part of the biological decomposition tank to supply water in the biological decomposition tank to the aeration tank; an outflow pipe connected between a lower part of the aeration tank and the lower part of the biological decomposition tank to return water in the aeration tank back to the biological decomposition tank; and an overflow water outflow pipe connected to an upper part of the aeration tank,
   a primary pure water system connected to the overflow water outflow pipe for receiving water from the overflow water outflow pipe and processing primary purification for water, and
   a secondary pure water system connected to the primary pure water system for processing secondary purification for water.

2. An ultrapure water production apparatus according to claim 1, in which the source water pretreatment system comprises the biological treatment device and a membrane filter, the primary pure water system comprises a first reverse osmosis device and a second reverse osmosis device and a mixed-bed ion exchange device, and the secondary pure water system comprises a low pressure mercury ultraviolet oxidization device and a mixed bed ion exchange device and an ultrafiltration membrane separation device, the devices being arranged in series and in the order in which they are mentioned in this claim.

3. An ultrapure water production apparatus according to claim 2, wherein said membrane filter removes the biomass flowing out from the biological treatment device.

4. An ultrapure water production apparatus according to claim 3, wherein low pressure mercury ultraviolet oxidization device operates to allow at lease one of decomposition and ionization of the organics decomposed at the biological decomposition device.

5. An ultrapure water production apparatus according to claim 1, in which the source water pretreatment system comprises the biological treatment device and a membrane filter, the primary pure water system comprises a mixed bed ion exchange device and a reverse osmosis device, and the secondary pure water system comprises a low pressure mercury ultraviolet oxidization device and a mixed bed ion exchange device and an ultrafiltration membrane separation device, the devices being arranged in series and in the order in which they are mentioned in this claim.

6. An ultrapure water production apparatus according to claim 1, wherein said biomass fixed on the activated carbon decomposes organics contained in the source water supplied thereto.

7. An ultrapure water production apparatus according to claim 6, wherein said organics in the source water are urea in a range of several tens ppb to several hundreds ppb, and purified water contains 0.5–0.8 ppb of TOC.

8. An ultrapure water production apparatus according to claim 1, further comprising a coagulator, disposed in at least one of the following positions;
   the stage after the biological treatment device;
   the stage before the biological treatment device.

9. An ultrapure water production apparatus according to claim 1, further comprising a coagulating filter device, disposed in at least one of the following positions;
   the stage after the biological treatment device;
   the stage before the biological treatment device.

10. An ultrapure water production apparatus according to claim 1, further comprising a biomass removing means, disposed in the stage after the biological treatment device, for removing biomass.

11. An ultrapure water production apparatus according to claim 10, in which the biomass removing means is a membrane filter.

12. An ultrapure water production apparatus according to claim 10, in which the biomass removing means is a sand filter device.

* * * * *